July 15, 1969 W. E. HATCH 3,456,170
CAPACITANCE-ADJUSTED CERAMIC CAPACITOR
Filed June 20, 1967
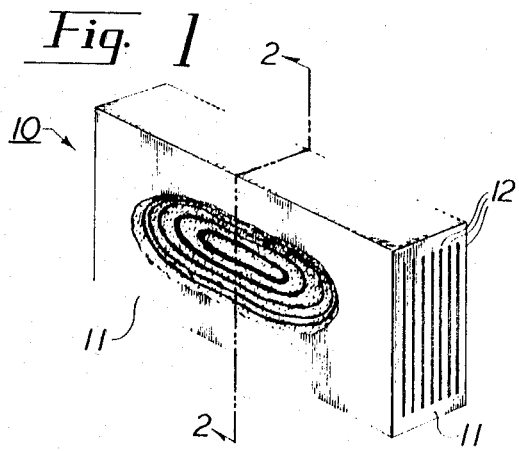
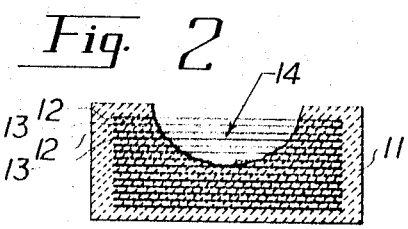
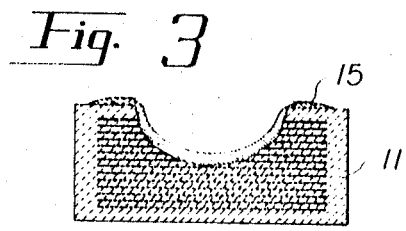

United States Patent Office 3,456,170
Patented July 15, 1969

3,456,170
CAPACITANCE-ADJUSTED CERAMIC CAPACITOR
Warren E. Hatch, Williamstown, Mass., assignor to Sprague Electric Company, North Adams, Mass., a corporation of Massachusetts
Filed June 20, 1967, Ser. No. 647,408
Int. Cl. H01g 1/10, 13/00; B44c 1/22
U.S. Cl. 317—258          7 Claims

ABSTRACT OF THE DISCLOSURE

A capacitance-adjusted multilayered ceramic capacitor having a plurality of alternate ceramic and electrode layers; a concavity extending through at least the outer ceramic layer and at least the first electrode and an insulating glaze coating said concavity. The concavity is formed by an air stream abrasive.

BACKGROUND OF THE INVENTION

The present invention pertains to capacitance-adjusted ceramic capacitors and to a process forming the same.

Ceramic capacitors having a plurality of alternate ceramic and electrode layers are widely used because of their comparatively high capacitance per volume. In order to adjust the capacitance of this type of capacitor downward to a predetermined value, it is common practice to abrade the edge of the buildup in order to decrease the plate area. This technique is quite harsh and it causes a good number of units to break. The rate of capacitance change during grinding is quite high and this requires greater adjustment control. Furthermore, a good number of rejects are caused by one electrode being smeared onto an adjacent electrode which results in the shorting of these electrodes.

SUMMARY OF THE INVENTION

It is an object of the present invention to present a ceramic capacitor adjusted to a close tolerance.

Another object of the present invention is to present a process for preparing accurately adjusted ceramic capacitors.

A capacitance-adjusted multilayered ceramic capacitor having a plurality of alternate ceramic and electrode layers is provided in accordance with this invention by a concavity extending through at least the outer ceramic layer and at least the first electrode layer. An insulating glaze coating said concavity is provided to seal the electrodes exposed in forming the concavity.

The invention also provides a process for adjusting multi-layered ceramic capacitors by means of an oscillating stream of abrasive particles directed against said capacitor at an angle generally normal to the planes of the electrodes.

BRIEF DESCRIPTION OF THE DRAWING

FIGURE 1 is a perspective view of the capacitance-adjusted capacitor of this invention showing the concavity with a plurality of electrodes exposed therein.

FIGURE 2 is a cross-section of the capacitor of FIGURE 1 taken along the lines 2—2 thereof.

FIGURE 3 is a cross-section similar to FIGURE 2 and showing a further stage of construction.

DETAILED DESCRIPTION OF THE DRAWING

The drawing shows a multilayered ceramic capacitor 10 having a ceramic dielectric 11 which separates generally parallel alternating electrodes 12 and 13. Electrodes 12 extend to one end of capacitor 10, and electrodes 13 extend to the other end. Electrodes 12 and 13 are in capacitive overlap throughout a major extent of capacitor 10. A concavity 14 extends into the capacitor 10 from a surface parallel to electrodes 12 and 13 so as to cut through at least one of the electrodes. An insulating glaze 15 coats the concavity and adjacent surface area.

Example

A number of multilayered barium titanate-palladium electrode capacitors were prepared by alternately depositing a layer of $BaTiO_3$ slip and a layer of palladium paint until a series of twelve electrodes were in capacitive arrangement. The buildup was cut into individual capacitor segments and fired to maturity in a kiln. To each end of each unit an electrode pickup was applied to afford electrical communication to the set of electrodes extending to that end. Alternate electrodes extended to opposite ends of the capacitor buildup and were exposed for contact by the electrode pickup material. The electrodes extending to one end of the capacitor stopped short of the other end, so that the application of pickup material to either end of the capacitor contacted only one set of electrodes. Substantial capacitive overlap of the two alternatively disposed sets of electrodes was provided so as to produce high capacitance per volume.

The formation of capacitors of this type is wellknown to the art and forms no part of the present invention. The capacitors had an average capacitance value of about 45% greater than the actual desired capacitance.

A series of the capacitors were mounted in jigs and a nozzle capable of being oscillated laterally was positioned adjacent the surface of each capacitor so as to be generally normal to the electrodes. The nozzles were adapted to deliver an air-entrained powdered abrasive at a pressure of about 80 p.s.i. The nozzles were also adapted to oscillate at a rate of about 160–180 times per minute. The capacitors were electrically connected to control apparatus which would monitor the capacitance of each unit. In operation, the nozzles where oscillated and the air-entrained abrasive was directed against the capacitors. The sweep of the abrasive created an oblong-shaped cavity in the ceramic and through six or seven of the electrodes of each capacitor. As the holes through the several electrodes enlarged during the abrasion process the capacitance decreased at a carefully controlled rate. The abrasion was continued until sufficient electrode mass was removed to decrease the capacitance to a predetermined value. Thereafter, the capacitors were cleaned and a commercial insulating glaze applied to the concavity and the adjacent ceramic surface. The units were put in a kiln and the glaze fired. The capacitors were then ready for lead attachment and encapsulation in a suitable protective covering.

It is preferred that the shape of the cavity formed by the oscillating stream be generaly that shown in the drawing. The sides of the cavity should be sloping rather than vertical (i.e. the shape of the cavity will be concave as illustrated in the drawing). This design provides greater separation between abraded electrode edges and less chance of smearing of electrode edges. There is also less chance of the formation of pits which are difficult to fill with the glaze material. With the more gently sloping sides rather than vertical sides, the glaze composition stays in place with a more or less uniform depth and does not flow to the bottom of the cavity. This insures complete and uniform insulation of the electrodes.

It is to be understood that the dielectric herein can be any of the prior art materials typified by the barium titanates, procelain, glass, etc. The electrodes, likewise, can be any of the prior art materials such as the platinum group metals, gold, silver, nickel, etc. The shape of the capacitor is not critical; it can be rectangular, square, round, etc. in plan view.

Since it is obvious that many changes and modifications can be made in the above-described details without departing from the nature and spirit of the invention it is to be understood that the invention is not limited to said details except as set forth in the appended claims.

What is claimed is:

1. A capacitance-adjusted multilayered ceramic capacitor comprising a plurality of alternate ceramic and electrode layers; a concavity extending through at least the outer ceramic layer and at least the first electrode, said concavity being located completely within the boarders of the broad surface of said capacitor, and an insulating material coating said concavity.

2. The capacitor of claim 1 wherein the ceramic is a barium titanate and the electrode are palladium.

3. A process for accurately adjusting the capacitance of a multilayered ceramic capacitor having a plurality of alternate ceramic and electrode layers comprising directing—a stream of abrasive particles against said capacitor at an angle generally normal to the planes of the electrodes, continuing the abrasion until sufficient electrode mass is removed to decrease the capacitance to a predetermined value, the abrasive action forming and defining a concavity located completely within the boarders of the broad surface of said capacitor.

4. The process of claim 3 wherein the abrasive-created cavity is coated with an insulating material and the material fired in place.

5. The capacitor of claim 1 wherein said insulating material is an insulating glaze.

6. The process of claim 3 wherein said stream is an oscillating stream.

7. The process of claim 4 wherein said material is an insulating glaze.

References Cited

UNITED STATES PATENTS

| | | | |
|---|---|---|---|
| 3,394,386 | 7/1968 | Weller | 317—261 X |
| 3,004,197 | 10/1961 | Rodriguez | 317—258 |
| 3,200,326 | 8/1965 | Pritiken | 317—258 X |
| 3,237,066 | 2/1966 | Martin et al. | 317—258 |
| 3,244,951 | 4/1966 | Wallace | 317—2610 X |
| 3,310,719 | 3/1967 | Seney | 317—258 |
| 3,330,696 | 7/1967 | Ullery | 29—25.42 X |

FOREIGN PATENTS 849,510  8/1960  Great Britain.

E. A. GOLDBERG, Primary Examiner

U.S. Cl. X.R.

29—25.42, 593; 117—8; 317—261